United States Patent [19]

Hen

[11] Patent Number: 4,947,934
[45] Date of Patent: Aug. 14, 1990

[54] METHOD OF INCREASING RETENTION OF SCALE INHIBITOR IN SUBTERRANEAN FORMATIONS

[75] Inventor: John Hen, Skillman, N.J.

[73] Assignee: Mobil Oil Corporation, New York, N.Y.

[21] Appl. No.: 305,055

[22] Filed: Feb. 2, 1989

Related U.S. Application Data

[63] Continuation-in-part of Ser. No. 130,492, Dec. 9, 1987, abandoned.

[51] Int. Cl.$^5$ .............................................. E21B 43/12
[52] U.S. Cl. ..................................... 166/279; 166/310; 252/8.552
[58] Field of Search ...................... 252/8.552, 180, 181; 166/310, 279, 271, 902

[56] References Cited

U.S. PATENT DOCUMENTS

| | | | |
|---|---|---|---|
| 3,827,977 | 8/1974 | Miles et al. | 252/8.552 |
| 4,046,707 | 9/1977 | Smith et al. | 252/181 X |
| 4,563,284 | 1/1986 | Amjad | 252/8.552 X |
| 4,579,676 | 4/1986 | Bull | 252/94 |

FOREIGN PATENT DOCUMENTS 1290554 9/1972 United Kingdom .

Primary Examiner—George A. Suchfield
Attorney, Agent, or Firm—Alexander J. McKillop; Charles J. Speciale; Lawrence O. Miller

[57] ABSTRACT

A method for inhibiting the formation of scale in a well penetrating a subterranean formation for the production of fluids from the formation comprising injecting into the formation an acidic aqueous solution having a pH effective to form a water-soluble complex of the inhibitor and the polyvalent cation, preferably in the range of 2 to 3, containing a mixture of a polyacrylate scale inhibitor having a molecular weight range from 500 to 10,000 and a polyvalent cation wherein the equivalent ratio of polyvalent cation to polyacrylate scale inhibitor is less than or equal to 0.5 in the acidic aqueous solution and allowing natural conditions in the formation to raise the pH of the solution an amount sufficient to cause controlled precipitation and increased deposition of the scale inhibitor in situ in the form of the polyvalent cation-polyacrylate complex. The scale inhibitor solution employed in this method avoids premature plugging of the formation, substantially extends the lift of the treatment and the polyvalent cation complex of the polyacrylate is fully inhibitive.

5 Claims, 5 Drawing Sheets

METHOD OF INCREASING RETENTION OF SCALE INHIBITOR IN SUBTERRANEAN FORMATIONS

CROSS-REFERENCE TO RELATED APPLICATIONS

This application is a continuation-in-part of co-pending application Ser. No. 130,492, filed Dec. 9, 1987, now abandoned.

FIELD OF THE INVENTION

This invention relates to inhibiting scale formation in a well penetrating a subterranean formation and particularly a method for increasing retention of the scale inhibitor in the formation.

BACKGROUND OF THE INVENTION

In the production of water, oil and gas from subterranean formations, scale deposits can frequently result in: plugged well bores, plugged well casing perforations, plugged tubing strings, stuck downhole safety valves as well as other valves, stuck downhole pumps and other downhole and surface equipment and lines, scaled formations and fractures in the vicinity of the well. Such scale formation can occur as a result of mixing of incompatible waters in the well, i.e., waters which when mixed produce precipitates, or as a result of temperature and pressure changes and the like in the produced waters during production. Generally, incompatible waters are formed as a consequence of waterflooding, as injected sea water mixes with formation water in the borehole during water breakthrough. The more common concern is scales deposited because of changes in supersaturation or solubility of minerals in the formation or produced waters caused by pressure and temperature changes, or changes in other physical and chemical environments such as gas compositions, ratio of gas/oil/water. Precipitation frequently encountered as scale include calcium carbonate, calcium sulfate, barium sulfate, magnesium carbonate, magnesium sulfate, and strontium sulfate. The deposition of scale is a very complex crystalline process initiated by a supersaturation-induced nucleation of a precipitate of the mineral, scale ions contact these nuclei and the crystal grows in certain crystalline pattern. The adherence of these mineral crystals unto the formation matrix, perforation, wellbore, tubings and equipment is a not well-understood process but once initiated, appears to be spontaneous as seen by the increasing thickness of the scale deposit and the steady decline in productivity. In some cases, production can be halted when valves and pumps are stuck—creating a potentially dangerous situation. The normal practice of treating with inhibitors does protect scales from forming in the perforations or near wellbore areas, well tubulars, downhole pump, other downhole equipment, and surface equipment. But such practice results in very short life requiring frequent re-treatments and necessitating periods of loss production. A significant extension of life means that down-times due to re-treatments will be much less frequent translating to better economics of operation.

The squeezing of chemicals for protecting wells, particularly oil wells, is widely practiced. A "squeeze" job might last one to six months depending on the nature of the subterranean formation into which the chemical is squeezed and the rate at which fluids e.g., oil and water, are produced by the well. A formation that has low permeability but high porosity, and from which low rates of oil and water are produced would likely bleed injected chemicals back for a long time. However, a problem arises with highly permeable formations which produce high rates of oil and water. This type of formation retains chemicals for only a short time because they are readily washed out of the permeable zones of the formation by the high volumes of produced fluids. The inhibitor is normally retained by an adsorption mechanism into the formation matrix and released by desorption during fluids production. In general, at least a third or more of the inhibitor is not absorbed but is immediately produced back, resulting in ineffective use and frequent retreatments.

In an article by Carlberg and Essel entitled, "Strontium Sulfate Scale Control by Inhibitor Squeeze Treatment in the Fateh Field", published in the *Journal of Petroleum Technology*, in Jun. 1982, there is disclosed a method for inhibiting scale formation in a subterranean limestone formation by injecting an acid form of a polyphosphonate which forms a slightly soluble calcium salt. Calcium ions released on dissolution of some of the limestone (calcium carbonate) rock by the acid precipitates calcium polyphosphonate allowing greater retention in the rock. However, this method does not work in sandstones, because sandstones are not soluble in acids, nor do they form calcium ions even when dissolved.

U.S. Pat. No. 3,827,977 to L. H. Miles and G. E. King, issued Aug. 6, 1974, discloses a method of increasing retention of an inhibitor by in situ formation of the relatively water or brine insoluble polycation salt of polyacrylic acid or hydrolyzed polyacrylamide. A strong acid solution (pH less than 1.5) used initially inhibits reaction of the polycation with the polyacrylic acid but the acid is eventually neutralized by the formation rock allowing the deposition of the water insoluble metal salt of the inhibitor in the formation. In the practice of the Miles et al invention, a larger than stoichiometric amount of the polyvalent metal salt (with $Ca^{+2}$ and $Zn^{+2}$ preferred) associated with the carboxylic acids groups of the inhibitor is required to insure complete reaction of the inhibitor (i.e., equivalent ratio of polyvalent metal cation to carboxylic acids greater than 1.0). For example, Miles et al cites a concentration of about 0.5 to 1.5% solutions by weight $Ca^{+2}$ with 0.5 to 1% solutions of the sodium polyacrylate. Assuming a molecular weight of 5000 for the polyacrylate (at 1% by weight) and $Ca^{+2}$ at 0.5%, the equivalent ratio of Ca to carboxylic acid groups is 1.8; while the mole ratio of Ca to polyacrylate is 62.5. The limiting factor in the use of such high concentrations of multivalent metal ions is the danger of damaging the formation by plugging it with premature precipitation. In an article by K. O. Meyers et al, entitled "Control of Formation Damage at Prudhoe Bay, Ark., by Inhibitor Squeeze Treatment", published in the *Journal of Pet. Tech.*, pp 26, in Jun. 1985, they caution against the presence of high concentrations of calcium when the inhibitor is squeezed into a well for the same reason. The normal criteria for selection of an inhibitor includes having high solubility in the reservoir brine and low susceptibility to precipitation by divalent cations. Therefore, introduction of the inhibitor in the manner taught by Miles et al affords little or no protection in inhibiting premature precipitation that causes plugging of the formation.

British Patent 1290554, to M. J. D'Errico and S. F. Adler discloses a process of treating an oil well to inhibit the formation of hard scale by the precipitation from the oil well brine of scale-forming water-insoluble salts. The process comprises converting water-soluble polyacrylate scale inhibitors to a solid water insoluble polymer by reaction with polyvalent metal cations. The solid water insoluble polymer is injected into the formation in conjunction with fracture treatments. The solid water insoluble polymer is required to be insoluble in water at 25° C. at a concentration of more than 50 ppm.

According to the present invention the danger of damaging the formation by precipitation is avoided by limiting the equivalent ratio of multivalent cations to inhibitor to a ratio of 0.5 or less, injecting the inhibitor in an aqueous solution having a pH effective to form a water-soluble complex of the inhibitor and the polyvalent cation, preferably in the range of 2 to 3, and limiting inhibitor molecular weight range to 500 to 10,000 which extends the life of the polyacrylate inhibitor 2 to 5 times that of a similar treatment without the polyvalent cation. Furthermore, at these low polyvalent cation concentrations, the polyacrylic inhibitor is very active while the activity is diminished significantly at a high polyvalent cation concentration (equivalent ratio greater than 0.5). Injecting the inhibitor and the polyvalent cation in an aqueous solution having a pH effective to form a water-soluble complex of the inhibitor and the polyvalent cation increases retention of the inhibitor in the formation. The water-soluble complex is much more adsorptive in sandstones than the inhibitor by itself.

SUMMARY OF THE INVENTION

The present invention provides for a method for inhibiting scale in a well penetrating a subterranean formation for the production of fluids from the formation comprising dissolving a polyacrylate inhibitor having a molecular weight of about 500 to 10,000 and a polyvalent cation in a aqueous solution having a pH effective to form a water-soluble complex of the inhibitor and the polyvalent cation, preferably in the range of 2 to 3, wherein the equivalent ratio of polyvalent cation to polyacrylate inhibitor is less than or equal to 0.5 and injecting the polyacrylate inhibitor, polyvalent cation aqueous solution into the formation about the well and allowing natural conditions (higher temperatures and higher pH) in the formation to raise the pH of the solution an amount sufficient to cause controlled precipitation and increased deposition of the scale inhibitor in situ in the form of the water-soluble polyvalent cation-polyacrylate complex. The polyvalent cation comprises any cation with a valence of two or greater, preferably $Cr^{+3}$, $Ti^{+3}$, $Al^{+3}$, $Fe^{+3}$ or $Zr^{+4}$ in the form of a water-soluble salt. Suitable polyacrylate inhibitors include all homopolymers or copolymers (composed of two or more co-monomers) containing as one of its components, an alpha, beta-ethylenically unsaturated acid monomer such as acrylic acid, methacrylic acid, diacids such as maleic acid (or maleic anhydride), itaconic acid, fumaric acid, mesoconic acid, citraconic acid and the like, monoesters of diacids with alkanols having 1-8 carbon atoms, and mixtures thereof. For simplicity, these acid monomers shall henceforth be called acrylic monomers. When the inhibitor is a copolymer, the other component monomers can be any alpha, beta-ethylenically unsaturated monomer with either a non-polar group such as styrene or olefinic monomers or a polar functional groups such as vinylacetate, vinyl chloride, vinyl alcohol, acrylate ester, vinylpyridine, vinyl pyrolidone, acrylamide or acrylamide derivatives, etc., or with ionic functional groups such as styrenesulfonic acid, 2-acrylamido-2-methylpropanesulfonic acid (AMPS), vinylsulfonic acid, vinylphosphonic acid. The polyacrylate inhibitor includes modification of the polymers described above such as phosphino-polyacrylic acid sold under the tradename "Belsperse 161" or "Belasol S-29" by Ciba Geigy. The preferred polyacrylate inhibitor is phosphino-polyacrylic acid.

DESCRIPTION OF THE PREFERRED EMBODIMENT

In accordance with the present invention, a subterranean formation is penetrated by a wellbore, including a casing in fluid communication therewith by means of well casing perforations in the zone of the formation. Production occurs from the formation by the flow of fluids including oil, gas and water through the perforations into the well bore with the fluids then being recovered. The production of fluids from the well can be inhibited by the formation of scale which plugs or partially plugs perforations in the casing of the wellbore, tubing inside the casing, downhole equipment such as pumps and safety valves or the formation near the well.

Figure 1:
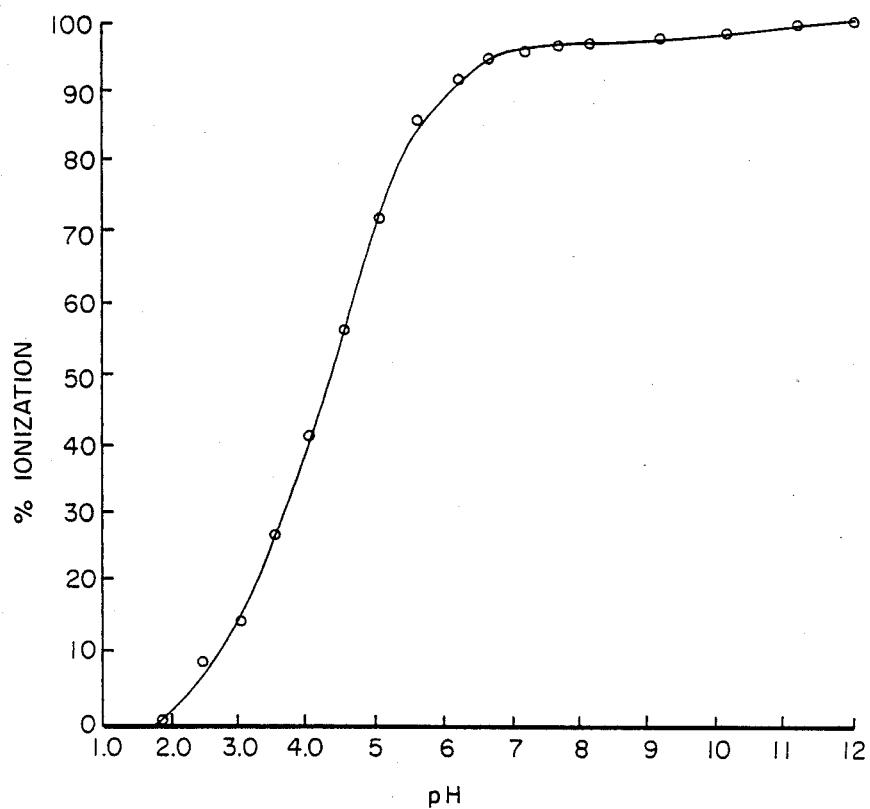
FIG. 1 illustrates the degree of ionization as a function of pH for polyacrylic acid (MW=1000) in a 1 molar NaCl solution.
Figure 2:
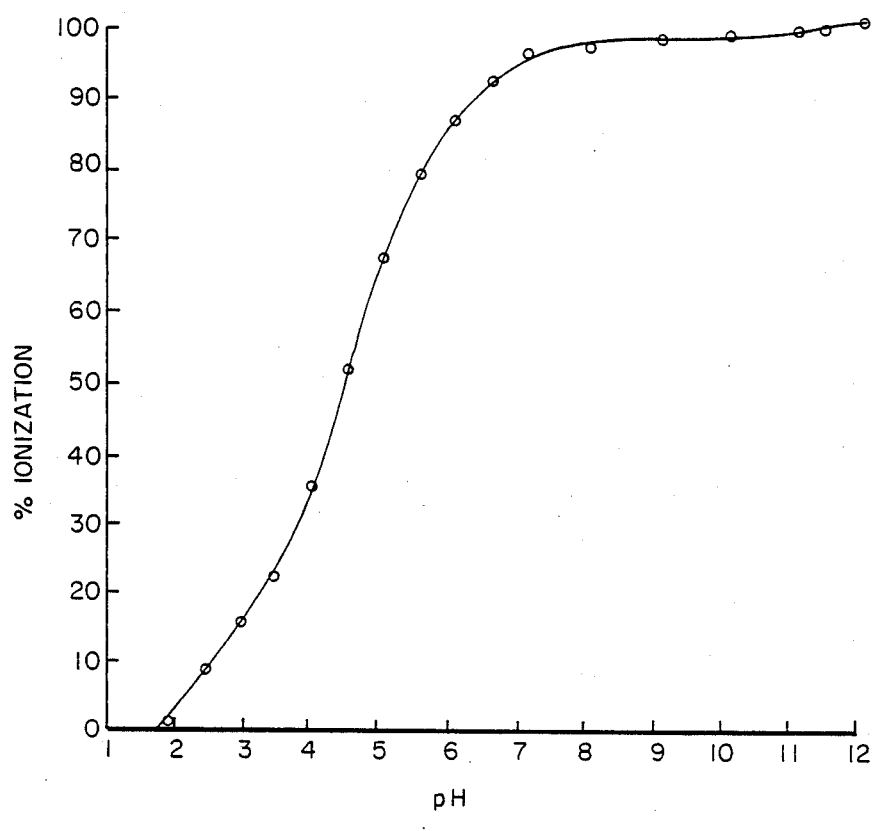
FIG. 2 illustrates the degree of ionization as a function of pH for phosphino-polyacrylic acid (MW=3500) in a 1 molar NaCl solution.
Figure 3:
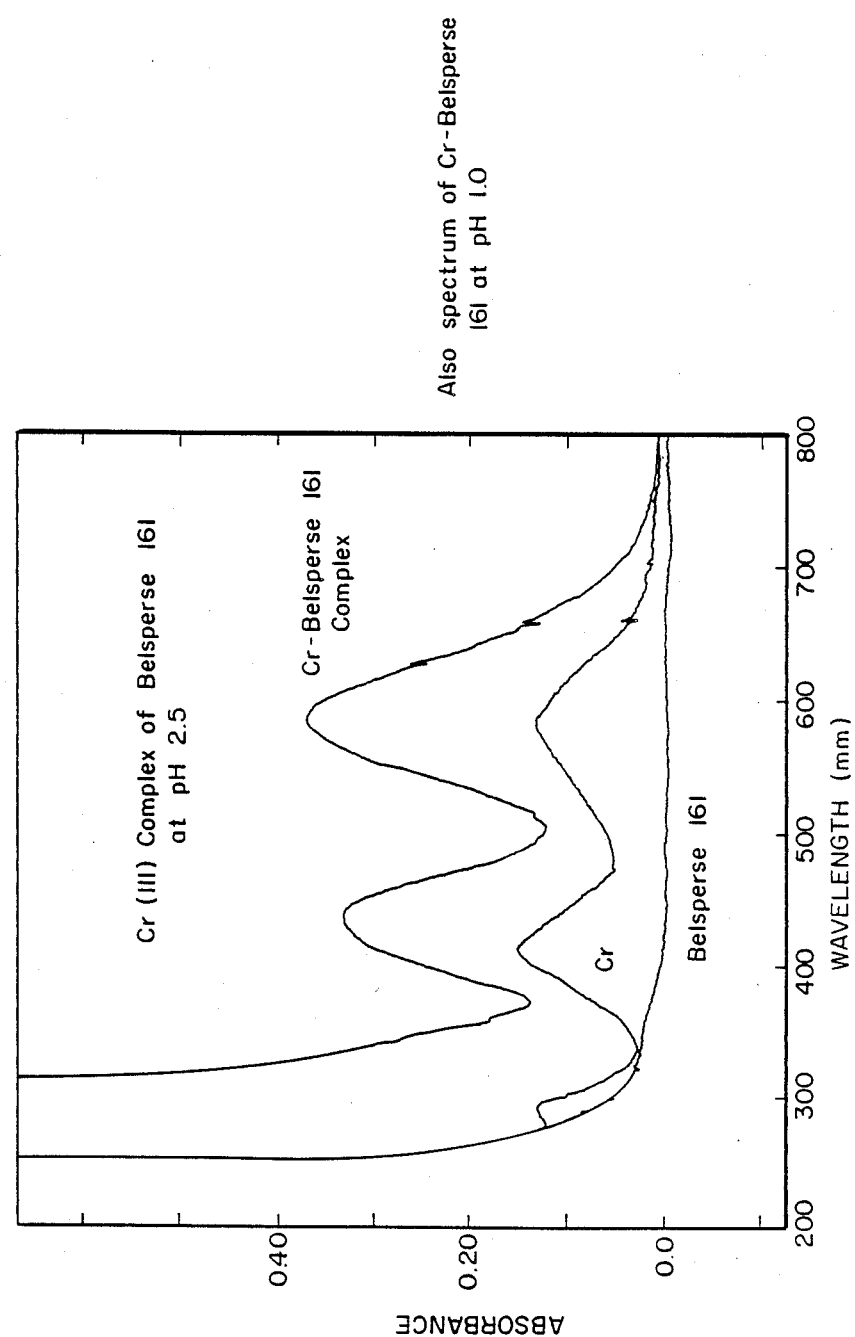
FIG. 3 illustrates the visible spectra of a water soluble Cr-complex of phosphino-polyacrylic acid at pH 2.5 compared with those of the individual components.
Figure 4:
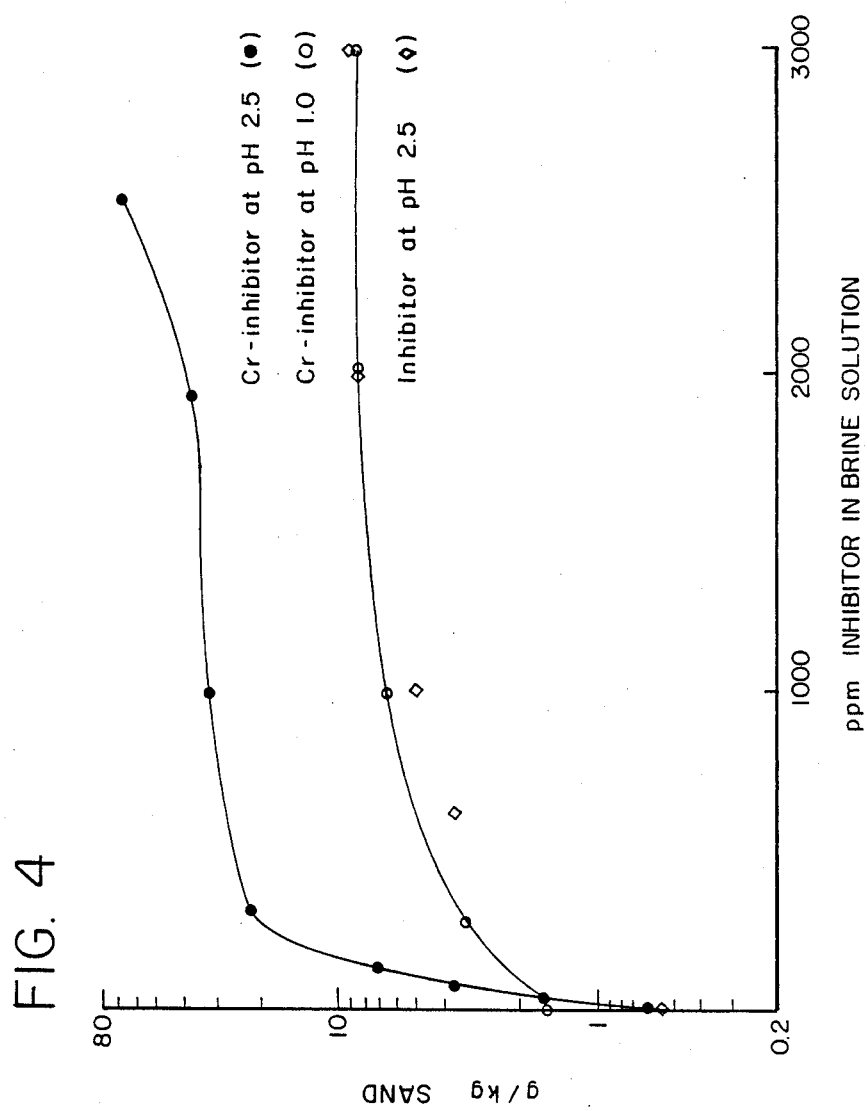
FIG. 4 illustrates the adsorption isotherms of Cr-phosphino-polyacrylic acid at 90° C. and at pH 1.0 and 2.5 compared to the inhibitor by itself.
Figure 5:
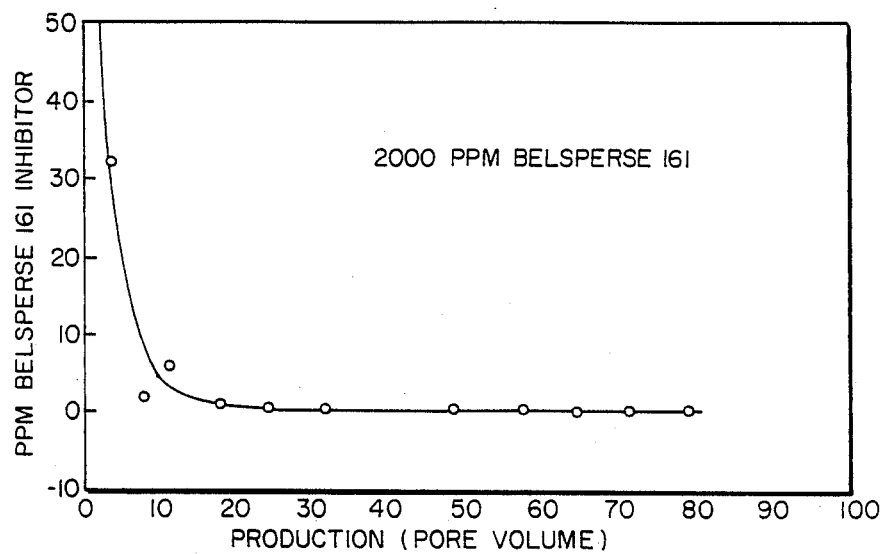
FIG. 5 illustrates the concentration (ppm) of inhibitor in produced water versus pore volume of back-produced water for a 2000 ppm inhibitor solution of Belsperse 161.
Figure 6:
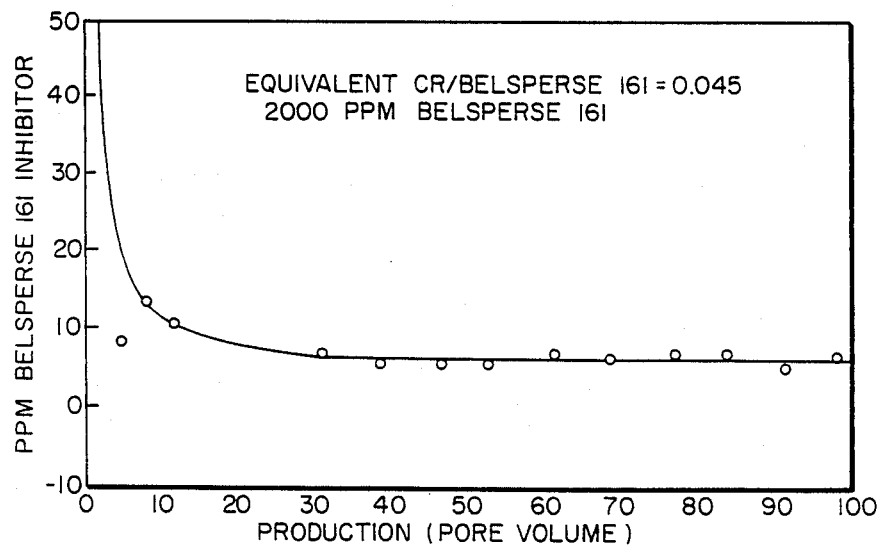
FIG. 6 illustrates the concentration (ppm) of inhibitor in produced water versus pore volume of back-produced water for a 2000 ppm inhibitor solution of Belsperse 161 and 22 ppm $Cr^{+3}$ (equivalent ratio=0.045).

In the present invention, a polyacrylate scale inhibitor having a molecular weight range from to 500 to 10,000 and a polyvalent cation are dissolved in an acidic aqueous solution having a pH effective to form a water-soluble complex of the inhibitor and the polyvalent cation wherein the equivalent ratio of polyvalent cation to polyacrylate is equal to or less than 0.5. The preferred effective pH of the solution is in the range of 2 to 3. The formation of the water-soluble complex is evidenced by the fact that polyacrylates are partially ionized at this pH range and the polyvalent cation such as $Cr^{+3}$ is in the olated oligomeric form as explained in the article by Hans Stunzi and Werner Marty entitled "Early Stages of the Hydrolysis of Chromium (III) in Aqueous Solution," published in *Inorganic Chemistry*, in Nov. 1983, the disclosure of which is incorporated by reference. FIGS. 1 and 2 show that partial ionization occurs for polyacrylic acid and phosphino-polyacrylic acid in a 1 molar NaCl solution at a pH in the range of 2-3 whereas no ionization occurs at a pH of 1.5 and below. FIG. 3 shows that a water-soluble complex is formed at a pH of 2.5 for a solution of $Cr^{+3}$ (0.0077M)

and phosphio-polyacrylic acid (Belsperse) (0.256N) as opposed to the separate components (as indicated by the large shifts in peak maxima and the 2-3 times rise in the extinction coefficient). At a pH of 1, the same solution of $Cr^{+3}$ and phosphino-polyacrylic acid exhibits the same visible spectra as $CR^{+++}$ by itself showing essentially no change in extinction coefficient indicating no complex is formed. As shown in the adsorption isotherm performed at a pH of 2.5 on crushed Berea sandstone in FIG. 4, the water soluble complex increases adsorption of the inhibitor approximately five times that of the inhibitor alone. The formation of the water-soluble complex increases retention of the inhibitor in the formation even as it is being injected and before any equilibration to the formation pH. Using an acidic solution having a pH in the range of 2-3 provides the following additional improvements over very acidic conditions (pH 1.5 or below). First it creates less damage to the formation than a more acidic solution because highly acidic solution promote further dissolution of multivalent cations from minerals in the formation such as $CaCO_3$ and sederite which would contribute to the additional damage to the formation. Second, it provides greater activity from the inhibitor since activity increases with an increase in pH and third, it improves the corrosion resistance of the injecting solution. Suitable cations are any cations with a valence of 2 or greater, preferably $Cr^{+3}$, $Ti^{+3}$, $Al^{+3}$, $Fe^{+3}$ and $Zr^{+4}$, in the form of a water-soluble salt. Generally any strong acid or mixtures of strong and weak acids can be used to prepare the acidic aqueous solution. Sulfuric acid should not be used for this purpose because the sulfate ions present scale problems. Suitable polyacrylate inhibitors include all homopolymers or copolymers (composed of two or more co-monomers) containing as one of its components, an alpha, beta-ethylenically unsaturated acid monomer such as acrylic acid, methacrylic acid, diacids such as maleic acid (or maleic anhydride), itaconic acid, fumaric acid, mesoconic acid, citraconic acid and the like, monoesters of diacids with alkanols having 1-8 carbon atoms, and mixtures thereof. For simplicity, these acid monomers shall henceforth be called acrylic monomers. When the inhibitor is a copolymer, the other component monomers can be any alpha, beta-ethylenically unsaturated monomer with either a non-polar group such as styrene or olefinic monomers, or a polar functional group such as vinylacetate, vinyl chloride, vinyl alcohol, acrylate ester, vinyl pyridine, vinyl pyrrolidone, acrylaminde or acrylamide derivatives, etc., or with ionic functional group such as styrenesulfonic acid, 2-acrylamido-2-methylpropanesulfonic acid (AMPS), vinylsulfonic acid, vinylphosphonic acid. The polyacrylate inhibitor includes modification of the polymers described above such as phosphino-polyacrylic acid sold under the tradename "Belsperse 161" or "Belasol S-29" by Ciba Geigy. The molecular weight range of the polyacrylate inhibitor utilized in this invention is from 500 to 10,000. As the inhibitor molecular weight increases, there is greater suceptibility towards uncontrolled precipitation and damage to the formation and well-bore. The selection of the scale inhibitor is highly dependent upon the characteristics of the formation, the composition, and other environmental factors. As acidic aqueous solution containing a polyacrylate inhibitor and a polycation is injected, the acid prevents any pre-mature precipitation or insolubilization by allowing the polycation to form a water-soluble complex with the inhibitor. The water soluble complex increases retention of the inhibitor in the formation even as it is being injected and before any equilibration to the formation pH. Upon entering the formation the acid is dissipated and the natural conditions (higher temperature and higher pH) in the formation increases the stability of the complex to further increase deposition of the scale inhibitor in situ in the form of the polyvalent cation-polyacrylate complex. The solution containing the complexed scale inhibitor is retained in the formation and is slowly released from the formation with the produced aqueous fluids as the well is produced thereby inhibiting formation of changing scale deposits in the formation in the vicinity of the wellbore, casing perforations, tubing and other downhole equipment as well as corrosion in the well. Generally, injection of the aqueous acid solution of polyacrylate and polyvalent cation is designated to extend at least several inches, 3 or 4, to several feet, 3 to 4, or more, from the wellbore. In general, an amount of inhibitor solution is injected into the formation surrounding the oil well that is sufficient to feed back a concentration of the inhibitor effective to prevent the formation of scale deposits. The acidic aqueous solution of polyvalent cations and polyacrylate may be driven to greater radial distances by using an overflush of water, oil or gas to assure that the scale inhibitor will be exposed and retained to a much greater surface area in the producing formations. Typically, the effective concentration of inhibitor being fed back is in the range of 0.05 to 50 ppm and preferably 0.5 to 10 ppm in the produced water. The exact quantity of inhibitor solution used for a treatment is dependent on a number of factors unique to the well that is being treated. These factors include: the degree of supersaturation expected of the scale forming minerals in the produced water, the rate of production of water, temperature and pressure profile in the well, the length of protection desired which is related to the radial distance reached by the inhibitor treatment, and others. The concentration of polyacrylate inhibitor employed in the acidic aqueous solution can vary from 0.1 to 20.0 percent by weight in fresh water, sea water or other available brines, but preferably in the 0.5 to 5.0 percent by weight range.

After the scale inhibitor has been deposited into the formation, production of fluids including oil and water from the well is resumed. The scale inhibitor is released slowly at effective concentration to inhibit scale formation or corrosion for a substantial period of time. The scale treatment of this invention may be repeated on a regular basis based on experience or when the chemical return concentration falls below minimum requirements or when other scale forming indicators indicate that additional treatment should be applied. The method disclosed in my co-pending patent application Ser. No. 134,730, filed 12/18/1987, can be used to determine the concentration of inhibitor in the produced water.

Phosphino-polyacrylic acid with an average molecular weight of 3000 to 4000 sold under the tradename "Belsperse 161" or "Belasol S-29" by Ciba Geigy is a very versatile inhibitor for treatment of sulfate and carbonate scales. Belsperse 161 is used here as a model inhibitor to demonstrate the concept. $Cr^{+3}$ (from $CrCl_3.6\ H_2O$) is used as an example of a polyvalent cation. The following examples are included to more clearly demonstrate the invention, and should not be interpreted as limiting the scope of the invention.

EXAMPLE 1

The effect of $Cr^{+3}$ concentration on the inhibition of barium sulfate by Belsperse 161 was investigated. In each case, 2 cc of a simulated sea water containing $Cr^{+3}$ and the inhibitor was mixed with 8 cc of a simulated connate water (or formation water; water native to the reservoir) and observed visually for precipitation of barium sulfate after standing for 20 hours at 24° C. The results shown in Table 1 indicate excellent inhibition at 4 ppm of Belsperse 161 with 0, 0.045, 0.090 and 0.36 equivalent ratio of $Cr^{+3}$ to inhibitor with significant deterioration at the 1.0 equivalent ratio. Likewise, much poorer performance at the higher $Cr^{+3}$ equivalent ratio was observed at 2 ppm of inhibitor.

TABLE 1

Effect of $Cr^{+3}$ On Inhibition of $BaSO_4$ By Belsperse 161

| ppm inhibitor | Equivalent Cr/inhibitor | visual observation $BaSO_4$ inhibition |
|---|---|---|
| 0 | 0 | 4 |
| 4 | 0 | 1 |
| 4 | 0.045 | 1 |
| 4 | 0.090 | 1 |
| 4 | 0.36 | 2 |
| 4 | 1.0 | 4 |
| 2 | 0 | 2 |
| 2 | 0.045 | 2 |
| 2 | 0.090 | 2 |
| 2 | 0.36 | 2-3 |
| 2 | 1.0 | 4 |

Legend for visual observation:
rankings from 4 to 1 in order of increasing cleanliness.
4 = heavy precipitation.
3 = moderate precipitation.
2 = slight precipitation.
1 = clear, no precipitation.

EXAMPLE 2

This example illustrates the beneficial extension of life of a polyacrylate inhibitor treatment provided by low concentrations of polyvalent cation. Berea sandstone cores having 1" diameter by 3" length and brine permeability of 148 to 277 millidarcy (md) were vacuum evacuated in a Hassler cell overnight before its pore volume was determined. After some preliminary saturation with brine, the core was heated to 90° C. and flooded with a 2000 ppm solution of Belsperse 161 inhibitor solution in simulated sea water (composition described in Table 2) at pH 2.5 for about 40–50 pore volumes (PV) to ensure saturation coverage. The core was then back produced with 70 to 120 PV of simulated connate water (composition described in Table 2) at pH 5.7 and at 90° C. to mimic an ongoing waterflood. The concentration of the inhibitor was followed in the back production phase to monitor the life of the treatment with the method described in my aforementioned patent application. As shown in FIG. 1, the inhibitor is exhausted after only 24 PV of connate water has been back produced. In contrast, as shown in FIG. 2, when 22 ppm $Cr^{+3}$ was incorporated with the 2000 ppm of Belsperse 161 flooding solution at pH 2.5 and the same coreflood experiment carried out, 5 ppm of the inhibitor was still produced after 113 PV. This represents an extension of inhibitor life of almost 5 times at a $Cr^{+3}$ to inhibitor equivalent ratio of only 0.045. Another advantage associated with the use of low $Cr^{+3}$ equivalent ratio was the negligibly small change in pressure measured during the inhibitor saturation phase and the back production phase. This suggests that formation damage is unlikely to be encountered. Additional cross-linking treatment allowed useful concentrations of from 3 to 5 ppm of Belsperse 161 to be released after back production of 93 to 113 PV of simulated connate water as shown in Table 3. For core run #5, excellent results were also obtained for a coreflood study at 0.36 equivalent ratio of $Cr^{+3}$ to Belsperse 161, which is still much below the stoichiometric equivalent ratio of 1.0.

TABLE 2

Simulated brine compositions

| components | | grams per liter | |
|---|---|---|---|
| | | sea water | connate water |
| $MgCl_2$ | $6 H_2O$ | 11.7 | 0.77 |
| $CaCl_2$ | $2 H_2O$ | 1.47 | 2.00 |
| KCl | | 0.70 | 0.66 |
| $BaCl_2$ | $2 H_2O$ | | 0.24 |
| $SrCl_2$ | $6 H_2O$ | | 0.53 |
| $NaSO_4$ | | 3.92 | |
| NaCl | | 25.10 | 49.19 | de-ionized $H_2O$ to 1 liter

TABLE 3

Extension of Life of Belsperse 161 at Low $Cr^{+3}$ Levels

| core run | Equivalent ratio Cr/Belsperse 161 | PV | mg/L Belsperse 161 |
|---|---|---|---|
| 1 | 0 | 24 | 0 |
| 2 | 0.045 | 113 | 5 |
| 3 | 0.045 | 112 | 3.3 |
| 4 | 0.045 | 93 | 2.6 |
| 5 | 0.36 | 120 | 3 |

2000 ppm Belsperse 161 was used for the initial flooding. For cores 2–4, 22 ppm $Cr^{+3}$ was also present. In core 5, 176 ppm of $Cr^{+3}$ was present.

EXAMPLE 3

This example demonstrates that the benefits derived from multivalent cation cross-linking of a polyacrylate inhibitor using low to medium permeability Berea sandstone cores (Example 2) can be extended to higher permeability cores. The same experiments shown in Example 2 were conducted using Berea cores having a brine permeability in the range of 350 to 650 md. Without $Cr^{+3}$, the Belsperse 161 inhibitor is depleted at about 25 PV, while at a 0.045 equivalent ratio of $Cr^{+3}$ to inhibitor, 3 ppm of the inhibitor is still produced after 68 PV as shown in Table 4. A nearly 3-fold extension in life was achieved with $Cr^{+3}$ cross-linking. It should be noted that in all the $Cr^{+3}$ containing runs, there was potential for higher extensions of inhibitor life, since the experiment was arbitrarily terminated at the specified PV.

From the foregoing specification, one skilled in the art can readily ascertain the essential features of this invention, and without departing from the spirit thereof, can adapt it to various diverse applications. It is out intention and desire that our invention be limited only by those restrictions of limitations as are contained in the claims appended immediately hereinafter below.

TABLE 4

Extension of Life of Belsperse 161 at Low $Cr^{+3}$ Levels
With Berea Sandstone Cores of Brine Permeability of 350–650 md

| core run | Equivalent Ratio Cr/Belsperse 161 | PV | mg/L Belsperse 161 |
|---|---|---|---|
| 6 | 0 | 25 | 0 |
| 7 | 0.045 | 68 | 3 |

2000 ppm Belsperse 161 with or without 22 ppm $Cr^{+3}$ was used for the initial flooding.

I claim:

1. A method for inhibiting scale in a well penetrating a subterranean formation for the production of fluids from the formation comprising:
   (a) dissolving polymeric inhibitor comprising an alpha, beta-ethylenically unsaturated carboxylic acid having a molecular weight range of about 500 to 10,000 and a polyvalent cation in an aqueous solution having a pH effective to form a water-soluble complex of the inhibitor and the polyvalent cation wherein the equivalent ratio of polyvalent cation to inhibitor is less than or equal to 0.5 in said aqueous solution; and
   (b) injecting said inhibitor, polyvalent cation aqueous solution into the formation about the well and allowing natural conditions in the formation to raise the pH of the solution in an amount sufficient to cause controlled precipitation and increased deposition of the scale inhibitor in situ in the form of a water-soluble polyvalent cation inhibitor complex.

2. The method of claim 1 wherein the polyvalent inhibitor is a homopolymer selected from the group consisting of polyacrylic acid, polymethacrylic acid, polyitaconic acid and polymaleic acid.

3. The method of claim 1 wherein the polymeric inhibitor comprises an alpha, beta-ethylenically unsaturated carboxylic acid monomer copolymerized with a monomer selected from the group consisting of an alpha, beta-ethylenically unsaturated monomer containing a non-polar group selected from the group consisting of styrene and olefinic monomers, an alpha, beta-ethylenically unsaturated monomer containing a polar functional group selected from the group consisting of vinylacetate, vinyl chloride, vinyl alcohol, acrylate ester, vinyl pyridine, vinyl pyrrolidone, acrylamide and acrylamide derivatives and an alpha, beta-ethylenically unsaturated monomer containing an ionic functional group selected form the group consisting of styrenesulfonic acid, 2-acrylamido-2-methylpropanesulfonic acid, vinylsulfonic acid and vinylphosphonic acid.

4. The method of claim 3 wherein the alpha, beta-ethylenically unsaturated carboxylic acid monomer in selected from the group consisting of acrylic acid, methacrylic acid, maleic acid, maleic anhydride, itaconic acid, fumaric acid, mesaconic acid and citraconic acid.

5. The method of claim 1 wherein the pH of the aqueous solution in step (a) is in the range of 2 to 3.

* * * * *